Figure 1:
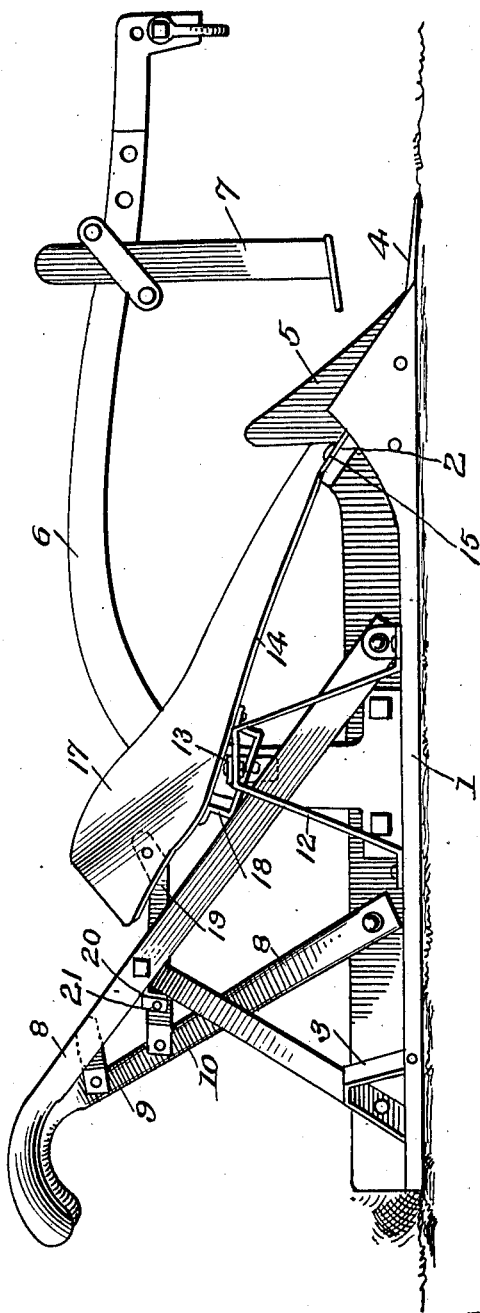

T. F. BRUENING.
DITCHING PLOW.
APPLICATION FILED JUNE 8, 1911.

1,021,131.

Patented Mar. 26, 1912.
2 SHEETS—SHEET 1.

Witnesses
W. T. Woodson
Juana M. Fallin

Inventor
T. F. Bruening
By
Attorneys

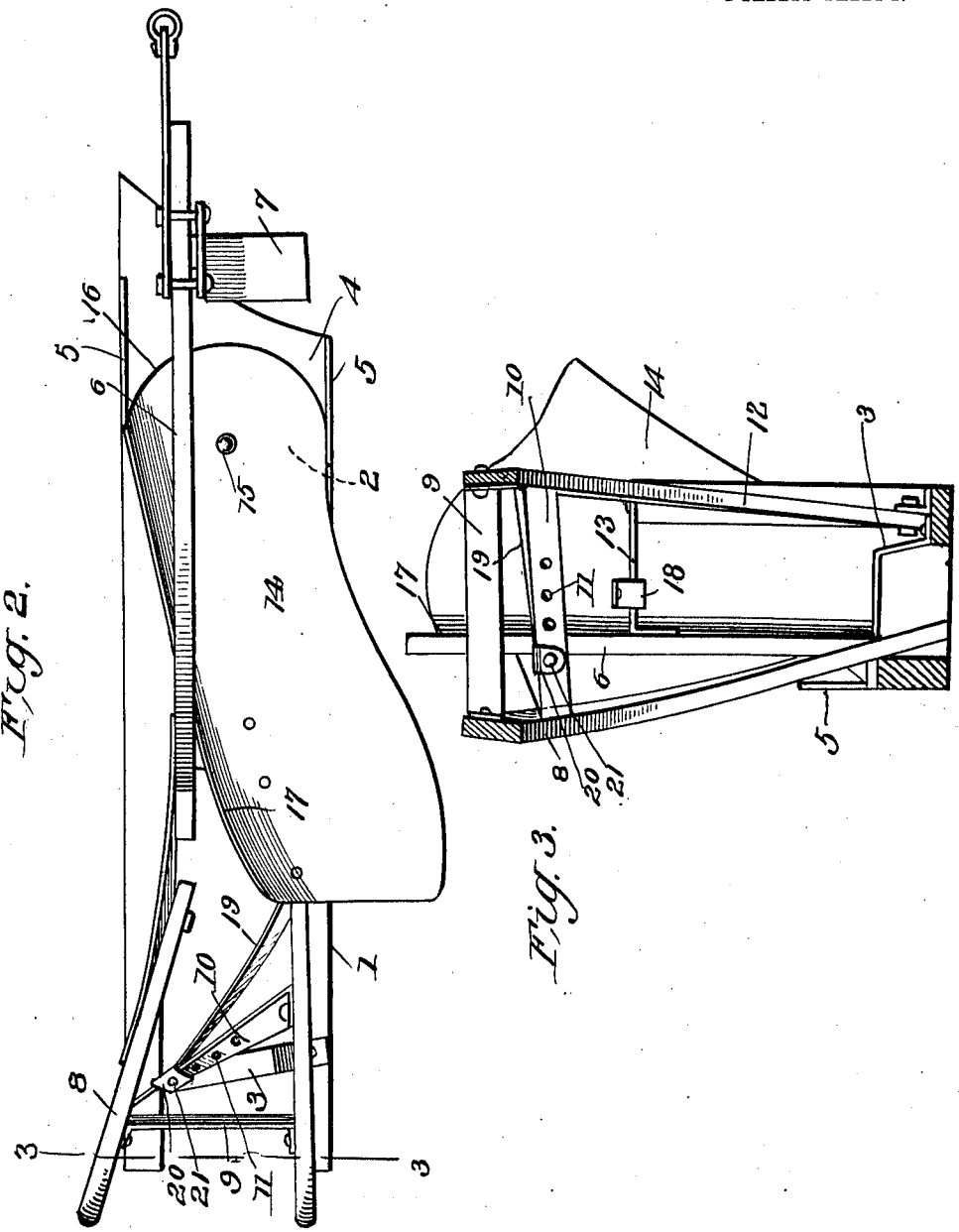

UNITED STATES PATENT OFFICE.

THEODORE F. BRUENING, OF RAYWOOD, TEXAS.

DITCHING-PLOW.

1,021,131.  Specification of Letters Patent.  Patented Mar. 26, 1912.

Application filed June 8, 1911. Serial No. 632,066.

*To all whom it may concern:*

Be it known that I, THEODORE F. BRUENING, citizen of the United States, residing at Raywood, in the county of Liberty and State of Texas, have invented certain new and useful Improvements in Ditching-Plows, of which the following is a specification.

This invention has relation to ditching plows, and has for its object to provide a simple and cheap structure of the character indicated especially adapted to be used for cutting shallow agricultural ditches. The plow may also be used to advantage for cutting ditches at the sides of roadways and other places.

In the accompanying drawings: Figure 1 is a side elevation of the plow; Fig. 2 is a top plan view of the same; Fig. 3 is a transverse sectional view of the same cut on the line 3—3 of Fig. 2.

Corresponding and like parts are referred to in the following description and indicated in all the views of the accompanying drawings by the same reference characters.

The ditch plow consists of parallel runners 1 which are connected together at their forward ends by a cross bar 2 and at their rear ends by a strut 3. A cutting share 4 is mounted upon the cross bar 2 and projects at its forward end beyond the forward ends of the runners 1. Cutters 5 are secured at the forward ends of the runners 1 and at the outer sides thereof and extend vertically at the side edges of the share 4 for the purpose of trimming the material at the side walls of a ditch while it is being cut. A beam 6 is attached at its rear end to one of the runners 1 and is provided at a point intermediate of its ends with a gage 7 which is located above or in advance of the share 4. Handles 8 are secured at their lower ends to the runners and the said handles are held in spaced relation to each other and in spaced relation to the beam by means of suitable braces 9. A cross bar 10 is secured at its ends to the inner sides of the handles 8 and is provided with a series of perforations 11. A bracket 12 is mounted upon the runner 1 opposite the runner to which the beam 6 is attached and a cross bar 13 is connected at one end with the upper end of the said bracket and at its other end with the intermediate portion of the beam 6 and serves as means for bracing the intermediate portion of the beam. A chute 14 is pivotally connected at its lower end portion to the cross bar 2 as it 15, and the forward edge of the said chute is arcuate as at 16 and fits snugly against the rear edge of the share 4. The chute 14 is provided at its edge portion adjacent the beam 6 with an upstanding flange 17 the rear end portion of which is curved away from the said beam. The chute 14 is inclined downwardly and forwardly and its forward edges are approximately in alinement with the cutters 5 located at the forward ends of the runners 1, but the rear portion of the said chute is disposed or curved to one side so that the material passing up the same is delivered at the side of the opening formed by the plow which side delivery is facilitated by the curved flange 17 located at the edge portion of the chute. A clip 18 is fixed to the under side of the chute 14 and loosely receives the cross bar 13. The said bar 13 serves as a guide for the clip as the chute is adjusted laterally, as will be hereinafter explained.

An arm 19 is attached at its forward end to the rear portion of the flange 17 and is provided at its rear end with a sleeve 20 which receives the cross bar 10. The sides of this sleeve are perforated and are adapted to receive a bolt 21 which may also pass through one of the perforations 11 and thus the arm 19 serves as a brace for holding the rear portion of the chute 14 in an adjusted position.

In operation draft animals are attached to the beam 6 in any usual or appropriate manner and as the plow is drawn along the ground, the share 4 will cut an incision therein and the depth of the cut is regulated by the gage 7. The material thus cut passes up between the cutters 5 and onto the lower end of the chute 14 and is forced up along the same, and at the upper portion of the said chute the curved portion of the flange 17 forces the said material to one side so that it is deposited upon the surface of the ground at the side of the ditch being formed. During the process of forming the ditch the runners 1 will travel along the bottom of the same adjacent to the side walls thereof and will prevent the plow from tilting to the right or to the left. As the chute 14 is shifted laterally at its rear end portion its arcuate edge portion 16 will turn upon the pivot 15, but inasmuch as the said arcuate edge 16 fits snugly against the rear edge of the share 4 the lateral adjustment of the rear portion of the chute will not open crevices or cracks between the forward edge of the chute and the rear edge of the share.

Having thus described the invention, what is claimed as new is:

1. A ditch plow comprising parallel spaced runners connected together, a beam connected with the runners, a cutting share mounted at the forward ends of the runners, a forwardly and downwardly inclined chute having its forward end pivoted behind the share, handles connected with the runners, and a bracing arm attached to the chute and adjustably connected with the handles.

2. A ditching plow comprising spaced parallel runners connected together, a beam connected with the runners, a cutting share located at the forward ends of the runners, vertically disposed cutters located at the forward ends and outer sides of the runners, handles connected with the runners, a forwardly and downwardly inclined chute pivotally mounted at its forward portion behind the cutting share, and a bracing arm attached at its forward end to the chute and adjustably connected at its rear end with the handles.

3. A ditching plow comprising spaced runners connected together, a cutting share supported at the forward ends thereof, a beam connected with the runners, handles connected with the runners, a forwardly and downwardly inclined chute pivotally mounted at its forward portion behind the rear edge of the share, said chute having at one side an upstanding flange which at its rear portion is curved laterally, and a bracing arm connected at its forward end with the chute and adjustably connected at its rear end with the handles.

4. A ditching plow comprising spaced runners connected together, a share supported at the forward ends thereof, a beam connected with the runners, handles connected with the runners, a bracket mounted upon one of the runners, a cross bar connecting said bracket with the intermediate portion of the beam, a forwardly and downwardly inclined chute pivotally mounted at its forward portion behind the rear edge of the share, a clip carried by the chute, said clip surrounding the cross bar, and an arm attached at its forward end to the chute and adjustably connected with the handles.

5. A ditching plow comprising spaced runners connected together, a share mounted at the forward ends thereof, a beam connected with the runners, handles connected with the runners, the share having an arcuate rear edge, a forwardly and downwardly inclined chute having an arcuate forward edge, the forward edge portion of the chute being pivotally mounted behind the rear edge of the share with the arcuate edges of the share and chute in close proximity, and an arm attached at its forward end to the chute and pivotally connected at its rear end with the handles.

In testimony whereof, I affix my signature in presence of two witnesses.

THEODORE F. BRUENING. [L. S.]

Witnesses:
W. D. DAVIS,
ED WOODS.

---

Copies of this patent may be obtained for five cents each, by addressing the "Commissioner of Patents, Washington, D. C."